United States Patent [19]

More, III et al.

[11] Patent Number: 5,421,198
[45] Date of Patent: Jun. 6, 1995

[54] WEATHER MONITORING APPARATUS AND METHOD

[75] Inventors: George H. More, III; Mark Whittington; John Jeffries, all of Austin, Tex.

[73] Assignee: Windrop Weather Devices, Austin, Tex.

[21] Appl. No.: 166,239

[22] Filed: Dec. 10, 1993

[51] Int. Cl.$^6$ .............................................. G01W 1/00
[52] U.S. Cl. ................. 73/170.15; 73/170.17
[58] Field of Search ........... 73/170.01, 170.07, 170.08, 73/170.09, 170.11, 170.14, 170.15, 170.17, 170.21

[56] References Cited

U.S. PATENT DOCUMENTS

| | | | |
|---|---|---|---|
| 2,384,954 | 9/1945 | Moore | 73/170.15 |
| 2,570,710 | 10/1951 | Quinteros | 73/170.15 |
| 3,552,204 | 1/1971 | Tourmen | 73/170.15 |
| 3,572,116 | 3/1971 | Penn | 73/170.15 |
| 3,713,336 | 1/1973 | Bernstein et al. | |
| 3,826,135 | 7/1974 | Hollmann | 73/170.15 |
| 3,871,220 | 3/1975 | Hillman | |
| 4,052,894 | 10/1977 | Pinnell et al. | |
| 4,548,074 | 10/1985 | Krueter | |
| 4,589,291 | 5/1986 | Sander | |
| 4,665,743 | 5/1987 | Masniere et al. | |
| 4,665,744 | 5/1987 | Smith | |
| 4,827,766 | 6/1989 | Nelson | |
| 4,888,986 | 12/1989 | Baer et al. | |
| 4,953,402 | 9/1990 | Tersiev | |
| 5,076,376 | 12/1991 | Bizet et al. | |
| 5,125,268 | 6/1992 | Caron | 73/170.21 |
| 5,192,938 | 3/1993 | Ort | |
| 5,203,207 | 4/1993 | Sugiyama | |

FOREIGN PATENT DOCUMENTS 56-6111  1/1981  Japan .................... 73/170.15

Primary Examiner—Richard E. Chilcot, Jr.
Assistant Examiner—R. Biegel
Attorney, Agent, or Firm—Shaffer & Culbertson; Russell D. Culbertson

[57] ABSTRACT

A weather monitoring device includes a wind force receiving body supported by a support member and a wind velocity and direction measuring arrangement. The wind velocity and direction measuring arrangement, preferably includes strain gauges mounted upon the support member and measures the magnitude and direction of flex in the support caused by wind acting upon the wind receiving body. Wind direction and velocity are calculated from the flex measured in the support. The velocity and direction measuring arrangement also includes features to compensate for strain gauge offsets and temperature drift. Additionally, a rain monitoring arrangement may be included in the weather monitoring device to provide rain measurements in addition to the wind measurements. The rain monitoring arrangement includes a rain collection surface and a rain volume measuring device. The rain collection surface is completely contained within the wind force receiving body and directs water to the rain volume measuring device. The rain volume measuring device preferably causes droplets having a uniform and known volume to fall upon a piezoelectric transducer and calculates precipitation per unit area from drop signals by the piezoelectric element.

18 Claims, 3 Drawing Sheets

WEATHER MONITORING APPARATUS AND METHOD

BACKGROUND OF THE INVENTION

This invention relates primarily to the measurement of wind velocity and direction. More particularly, this invention relates to a device and method for measuring wind velocity, wind direction, and perhaps other weather parameters such as precipitation. The apparatus and method provide the wind measurements using substantially no moving parts and using a single collector body for wind force and precipitation.

Wind measuring devices such as weather vanes and wind socks provided qualitative information on wind velocity and direction. Devices incorporating rotating propellers or moving arms provided more quantitative information on wind velocity, however, these rotating propeller-type devices usually required separate structures to measure wind direction. Further, because rotating propeller-type devices included moving parts, they were subject to frequent mechanical failure and required substantial maintenance and calibration.

Early precipitation measuring devices, such as hollow cylindrical or funnel structures captured falling rain and included calibrations that allowed a user to determine the amount of precipitation that had fallen since the device was last checked. Other devices collected precipitation and then metered it in uniform drops which could be counted to provide a precipitation volume measurement. However, these precipitation measuring devices were strictly limited to measuring precipitation and provided no measurement of other weather parameters, particularly wind velocity and direction.

SUMMARY OF THE INVENTION

It is a general object of the invention to overcome the above described limitations and others associated with prior weather monitoring devices. More particularly, it is an object of the invention to provide an improved apparatus and method for measuring wind velocity and wind direction. Another object of the invention is to provide an apparatus for measuring precipitation per unit area in addition to wind parameters. The latter apparatus and method employs a single collector for all weather parameters and preferably employs substantially no moving parts.

To accomplish these objects, a weather monitoring device according to the invention includes a wind force receiving body, a support for supporting the wind force receiving body, and force detecting means for detecting the wind force exerted on the wind force receiving body. The device may also include a rain collection surface associated with the wind force receiving body, and rain measuring means for measuring the volume of rain received on the rain collection surface.

The wind force receiving body is exposed to wind and is mounted on the support such that the force of the wind on the wind force receiving body is transmitted to the support. The force detecting means detects this resultant force applied to the support and determines wind velocity and direction from the resultant force.

In one preferred form of the invention, the support comprises a cylindrical rod and the force detecting means includes three strain gauges mounted about the circumference of the support to measure the longitudinal strain on the support. A first gauge and a second gauge are preferably spaced apart 90 degrees about the support and the first and a third strain gauge are preferably spaced apart 180 degrees about the support. The strain gauges sense the flex in the support caused by the wind acting on the wind force receiving body and the relative strain outputs of the strain gauges may be related empirically to wind velocity and direction. In this preferred form of the invention, the force detecting means includes signal processing means that creates an X output by subtracting the second strain gauge output from the first strain gauge output and creates a Y output by subtracting the second strain gauge output from the third strain gauge output. These X and Y signals represent force vectors that the signal processing means then combines mathematically and multiplies by an empirically determined correlation factor to produce a resultant vector representing wind speed and direction.

The signal processing means also preferably includes threshold turbulence signal means for extracting initial strain gauge readings along the X and Y axes. When a turbulence signal produced from these initial X and Y readings falls below a threshold amount, indicating a period of minimal wind velocity, an offset register records the initial X and Y values as offset X and Y values. The signal processing means then subtracts these offset values from the initial X and Y values produced by the strain gauges to produce corrected X and Y values. This threshold turbulence and offsetting arrangement corrects for offset errors in the strain gauge outputs and thereby makes the wind speed and direction measurements more accurate.

The preferred signal processing means further includes features for compensating for temperature drift associated with the strain gauges. The temperature compensation arrangement in the signal processing means produces a reference signal from the strain gauge outputs whose value changes significantly with temperature. Correlation coefficient means then creates correlation coefficients using the initial X and Y signals and the reference signal. Correlation correcting means employs these correlation coefficients and the reference signal to adjust the value of the initial X and Y signals to account for the strain gauge temperature drift.

In the form of the invention that includes the precipitation measuring arrangement, the rain collection surface is located within the wind force receiving body and below a rain collection opening at the top of the wind force receiving body. The rain collection surface funnels rain water into a rain collection container that is not mounted on the wind force receiving body but is preferably sheltered by the wind force receiving body. An orifice in the rain collection container meters out rain water in droplets of a known volume and the rain measuring means counts these droplets to determine the volume of rain per unit area of the rain collection surface.

The rain measuring means preferably includes a piezoelectric transducer that produces an electric signal when struck by a drop falling from orifice. The rain measuring means also includes means for summing the number of signals produced by the transducer to calculate the volume of water that has fallen upon the rain collection surface. Alternatively the rain measuring means may include a tipping bucket type of rain measuring device or any other type of rain measuring device.

The present invention provides several important advantages over prior devices. The device according to the present invention preferably includes substantially no moving parts for measuring wind speed and direction, thus greatly reducing the opportunity for component failures. Further, the preferred form of the invention performs the wind measuring functions and the precipitation measuring functions with a single collecting structure thus simplifying the construction and installation of the device. Additionally, the present invention provides automatic zero offset and temperature compensation features that enable the device to produce very accurate wind measurements over a wide range of wind velocities.

These and other objects, advantages, and features of the invention will be apparent from the following description of the preferred embodiments, considered along with the accompanying drawings.

DESCRIPTION OF THE PREFERRED EMBODIMENTS

Figure 1:
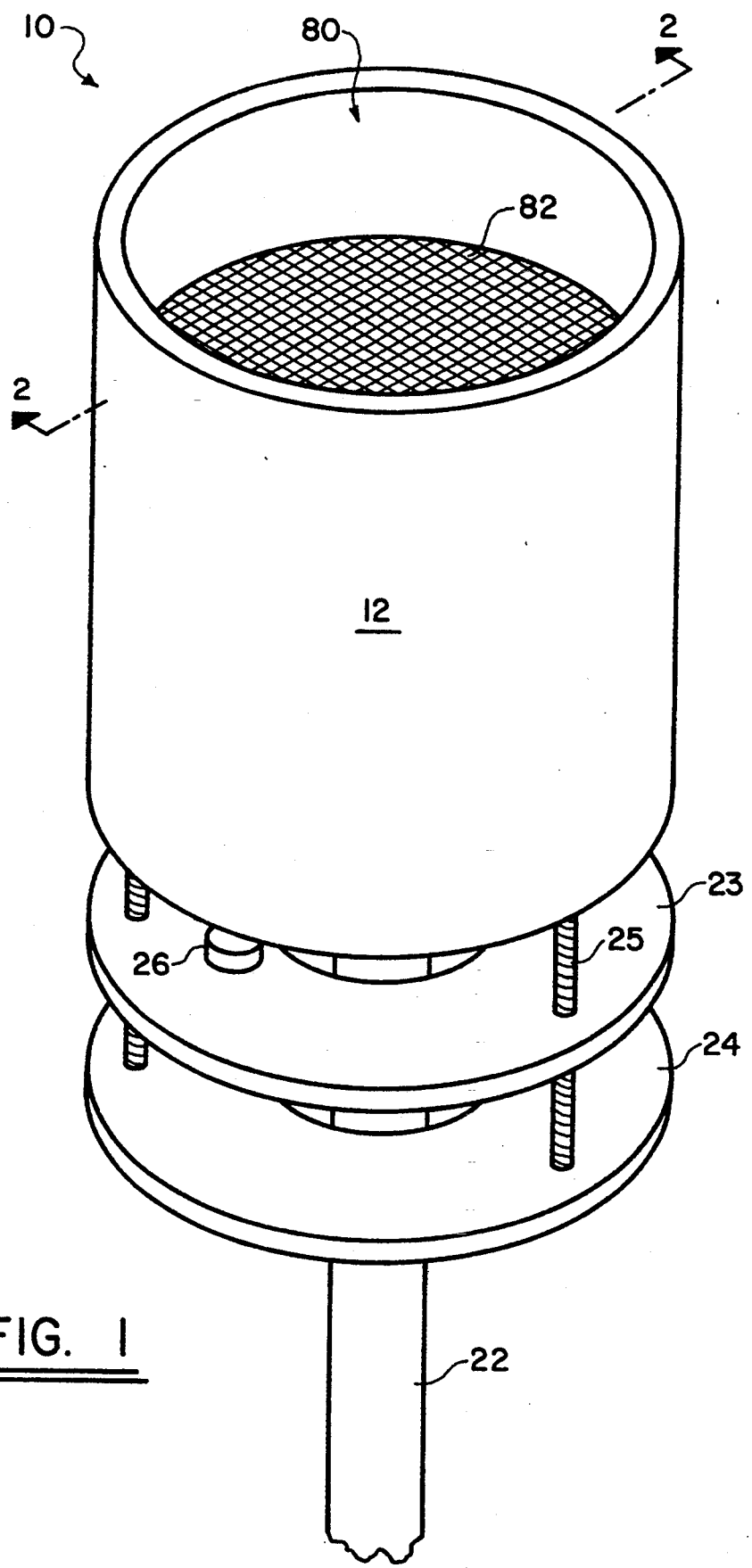
FIG. 1 is a perspective view of a weather monitoring device embodying the principles of the present invention.
Figure 2:
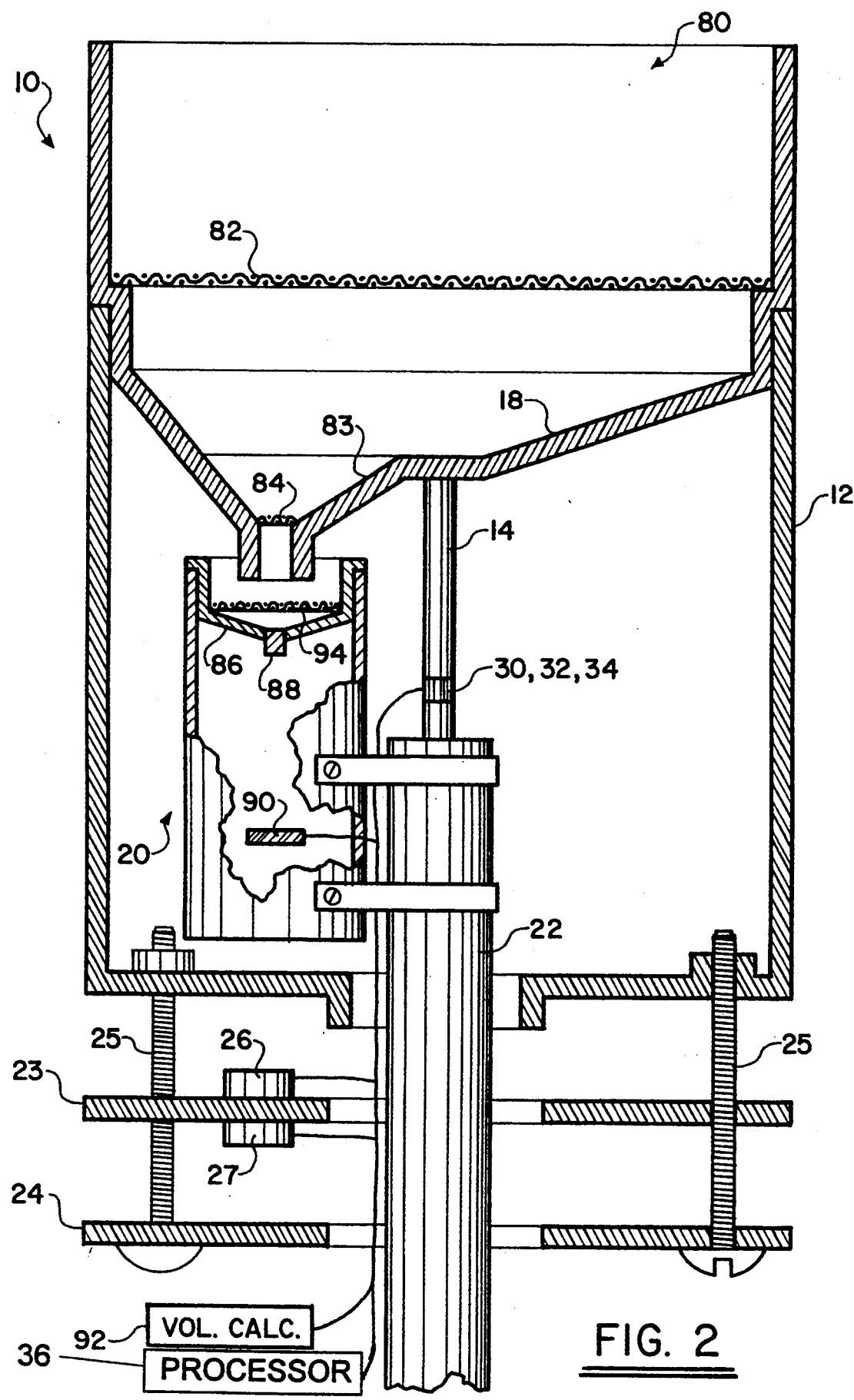
FIG. 2 is a longitudinal section view of the weather monitoring device taken along line 2—2 in FIG. 1 and partially broken away to show interior elements of the rain measuring means.
Figure 3:
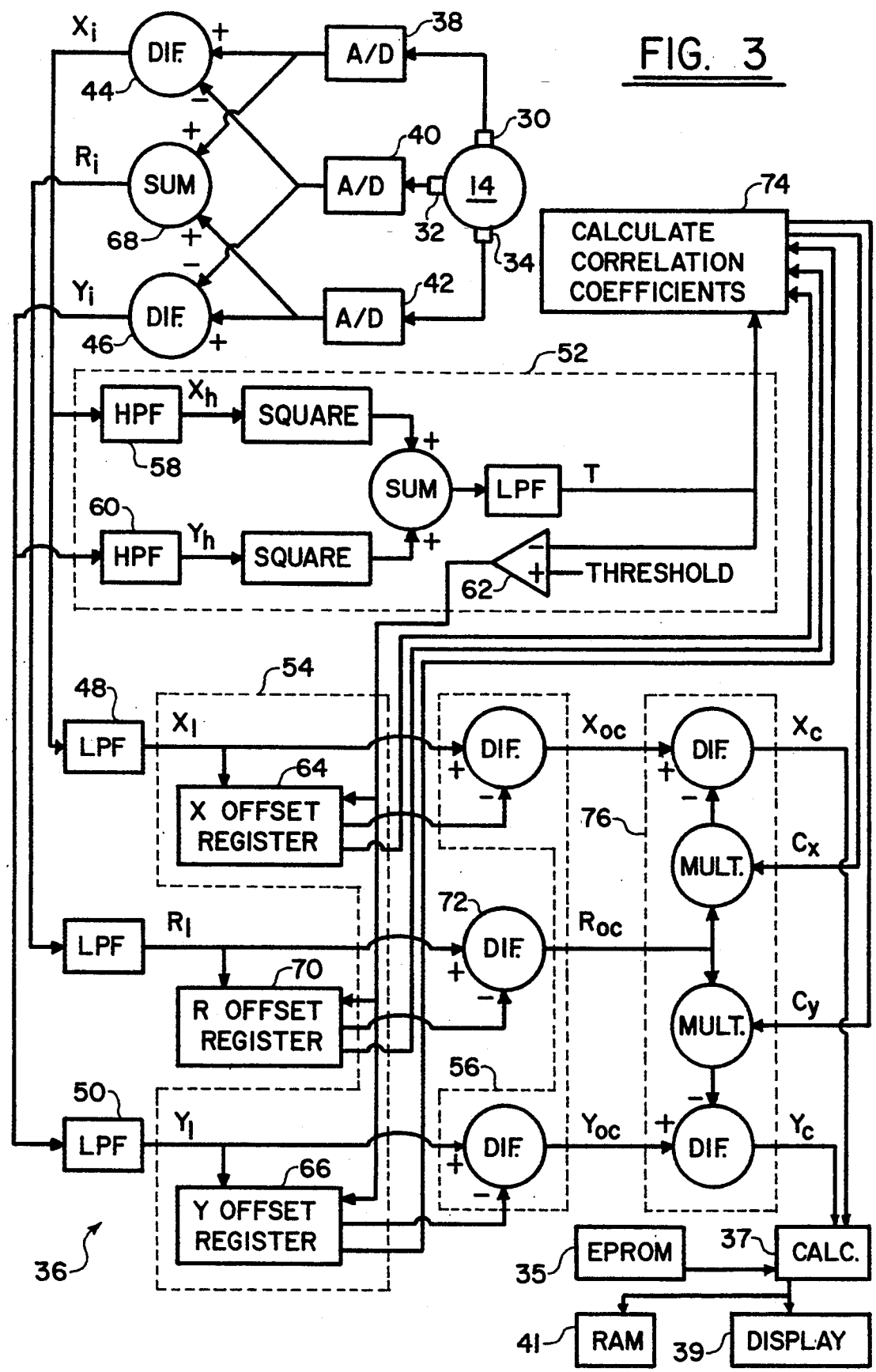
FIG. 3 is a schematic representation of the signal processing steps performed by the preferred weather monitoring device according to the invention.

A weather monitoring device 10 embodying the principles of the present invention is shown by way of illustration in FIGS. 1 through 3. The weather monitoring device 10 comprises a wind force receiving body 12, a support 14, and force detecting means (shown in its entirety in FIG. 3) for detecting the wind force exerted on the force receiving body and determining wind speed and direction from that force. The preferred device 10 also includes a precipitation monitoring device having a rain collection surface 18, and rain measuring means, a portion of which is shown generally at reference numeral 20, for measuring the volume of rain received upon the rain collection surface.

Referring particularly to FIG. 2, the preferred wind force receiving body 12 is substantially cylindrical in shape and in any event symmetrical about its longitudinal axis. The support 14 is positioned within the wind force receiving body 12 and supports the entire weight of the body. In the illustrated form of the invention, the support 14 and body 12 are connected via the structure forming the rain collection surface 18. The support 14 is preferably formed of solid metal and is connected at its lower end to a base 22 which is itself supported by suitable means (not shown). The base 22 and support 14 combination hold the wind force receiving body 12 with its longitudinal axis extending vertically and in a known orientation with respect to true north to facilitate wind direction measurements.

In the preferred form of the invention shown in FIGS. 1 and 2, first and second aspiration plates 23 and 24, respectively, are connected to the wind force receiving body 12 by threaded screws 25. The circularly shaped aspiration plates 23 and 24 protect the device 10 from direct and reflected radiation from the surface (not shown) surrounding the device. Also the aspiration plates provide a convenient location for additional elements such as temperature transducer 26 and humidity transducer 28.

The force detecting means detects a resultant force applied to the support 14 by wind acting on the wind force receiving body 12 and determines wind velocity and direction from the resultant force. As shown particularly in FIGS. 2 and 3, the force detecting means includes three linear strain gauges 30, 32, and 34 and signal processing means 36. The strain gauges produce signals representing the strain in the support 14 caused by the force of wind acting upon the wind force receiving body 12 and the signal processing means 36 calculates wind velocity and direction from the signals produced by the strain gauges.

Preferably, the strain gauges are each model SS-060-033-500P-S1 gauges manufactured by Micron Instruments. However, one skilled in the art will readily appreciate that optical, laser, photoelectric, ultrasonic, and other devices could also be used to measure strain in the support 14. Regardless of the type of strain gauges employed, the strain gauges 30, 32, and 34 are mounted upon the support 14 about its circumference such that the measuring axes of the strain gauges align with the longitudinal axis of the support. The first strain gauge 30 and the second strain gauge 32 are preferably spaced apart 90 degrees about the circumference of the support 14 and the third strain gauge 34 is preferably spaced apart 180 degrees from the first strain gauge 30. Also, the strain gauges 30, 32, and 34 preferably reside about the center of gravity of the combination of the wind force receiving body 12, the rain collection surface 18, the first 23 and second 24 aspiration plates, and the other components supported by the support 14. Mounting the strain gauges at this center of gravity minimizes error signals due to side to side acceleration of the assembly such as from the swaying of the support 14.

FIG. 3 provides a schematic representation of the signal processing means 36 for processing the signals provided by the strain gauges 30, 32, and 34. With the exception of the strain gauges shown schematically in FIG. 3, the elements of the signal processing means 36 represent certain functions or operations performed on the signals and means for performing those functions. In the preferred form of the invention the signal processing means 36 is implemented in a program performed by a suitable processor. However, any suitable means for performing the specified function may be employed according to the invention.

As indicated by FIG. 3, the strain gauges 30, 32, and 34 are connected to transmit their respective output signals to the signal processing means 36. Digital convertors 38, 40, and 42 convert the analog output signals from strain gauges 30, 32, and 34 to digital signals. The signal processing means 36 then produces an initial signal $X_i$ by subtracting the digitized output of second strain gauge 32 output from the digitized output of first strain gauge 30 with a first signal differencing means 44. Second signal differencing means 46 produces an input signal $Y_i$ by subtracting the digitized output of second strain gauge 32 output from the digitized output of third strain 34 gauge. The signals $X_i$ and $Y_i$ are vector quantities that represent the strain in the support 14 in specific directions about its circumference.

The strain in the support 14 in the particular directions represented by signals $X_i$ and $Y_i$ is related to the force of the wind acting on the wind force receiving body 12 in those directions. Also, the force acting on the wind force receiving body 12 is related to the free stream velocity of the wind passing the body. Therefore, the strain gauge signals $X_i$ and $Y_i$ may be used to calculate both wind velocity and direction through their trigonometric relationships. For example, in the illustrated preferred form of the invention with the illustrated spacing between the three strain gauges 30, 32, and 34, the $X_i$ and $Y_i$ signals relate to orthogonal force components acting on the body 12. In this embodiment, wind velocity may be determined by the expression:

$$V = \sqrt[4]{X^2 + Y^2} \quad (C)$$

where V is wind velocity, C is a constant empirically determined for the particular wind force receiving body, and X and Y are the $X_i$ and $Y_i$ signals preferably adjusted for initial offsets and temperature drift as discussed below. Also, with the directions of $X_i$ and $Y_i$ known from the orientation of the device 10, wind direction may be determined from the angle between the $X_i$ and $Y_i$ values treated as the sides of a right triangle lying in a plane perpendicular to the body 12 and with its hypotenuse originating at the longitudinal axis of support 14. The angle may be determined by any appropriate trigonometric function.

As shown in FIG. 3, the signal processing means 36 further includes storage means 35, preferably an EPROM device, for storing the required empirically determined constants and algorithms, and velocity and direction calculating means 37 for calculating wind velocity and direction from the stored values and X and Y inputs derived from the strain gauge outputs. The wind velocities and directions may be displayed on a suitable display 39 and recorded in storage device 41, preferably random access memory. Additionally, the wind velocity and direction data may be transferred to a suitable printer or plotter (not shown) to provide a hard copy record.

Because the wind receiving body 12 is mechanically underdamped and tends to continue to oscillate during lulls in the wind, the signals $X_i$ and $Y_i$ have substantial oscillatory components that are unrelated to wind velocity or direction. To remove high frequency components from the initial $X_i$ and $Y_i$ signals the signal processing means 36 includes means for filtering the signals prior to the wind parameter calculation. A first low pass filter 48 filters signal $X_i$ to remove high frequency components and produce the filtered signal $X_l$. A second low pass filter 50 filters signal $Y_i$ to remove high frequency components and produce the filtered signal $Y_l$. Preferably, both the first and second low pass filters 48 and 50, respectively, have a cut off frequency of approximately 2 hertz.

Further, because the strain gauges used with the present invention are not perfectly matched, they do not necessarily read zero when the support 14 is unstressed during periods of little or no wind activity and thus the signals $X_i$ and $Y_i$ may contain significant offsets. Therefore, the preferred form of the invention includes an arrangement for removing offset values from the low pass filtered signals $X_l$ and $Y_l$.

The arrangement for removing offsets from the strain gauge signals comprises threshold turbulence signal means 52, offset register means 54, and offset signal differencing means 56. The threshold turbulence signal means 52 produces a threshold turbulence signal in response to a minimal wind velocity condition. High pass filters 58 and 60 are included in the threshold turbulence signal means 52 to filter the signals $X_i$ and $Y_i$ respectively and produce the signals $X_h$ and $Y_h$ that contain only high frequency components. Preferably, the high pass filters 58 and 60 have cutoff frequencies of approximately 4 hertz. The signals $X_h$ and $Y_h$ are then squared, summed, and low pass filtered, to produce a turbulence signal T whose magnitude increases with wind velocity. A suitable comparator 62 then compares the turbulence signal T to a predetermined stored threshold signal and produces a latch signal when the turbulence signal value falls below the threshold signal, indicating minimal wind at that time.

The offset register means 54 stores offset values $X_{offset}$ and $Y_{offset}$ in response to the latch signal from the comparator means 62. The offset register means 54 comprises a first register 64 which receives the $X_l$ signal and a second offset register 66 which receives the $Y_l$ signal. When the comparator 62 produces a latch signal, offset registers 64 and 66 latch the values of signals $X_l$ and $Y_l$ present at the time, those values becoming the offset values $X_{offset}$ and $Y_{offset}$ respectively. The offset values $X_{offset}$ and $Y_{offset}$ held in offset registers 64 and 66 represent the values of $X_l$ and $Y_l$ during the latest period of minimal wind activity.

The offset signal differencing means 56 subtracts the offset value $X_{offset}$ then existing in register 64 from the signal $X_l$ to produce an offset corrected signal $X_{OC}$ and subtracts the offset value $Y_{offset}$ then existing in register 66 from the signal $Y_l$ to produce an offset corrected $Y_{OC}$ signal. These corrections are continually performed using the offset values $X_{offset}$ and $Y_{offset}$ existing in registers 64 and 66. The offset corrected signals $X_{OC}$ and $Y_{OC}$ represent the X and Y signals corrected for mismatch and initial unstressed readings from the strain gauges.

The preferred form of the invention also includes means for correcting errors caused by temperature drift in the strain gauges 30, 32, and 34. During periods when offset values $X_{offset}$ and $Y_{offset}$ are reset frequently, the offset correction provided by the threshold turbulence signal means 52 and offset signal differences means 56 corrects for temperature drift errors. However, the temperature drift compensating means modifies the offset corrected signals $X_{OC}$ and $Y_{OC}$ to compensate for temperature drift error even during prolonged periods of wind activity when the threshold turbulence signal means does not reset the offset values $X_{offset}$ and $Y_{offset}$. The temperature drift compensating means is illustrated in FIG. 3 and includes reference signal producing means 68, reference signal offset register means 70, reference correcting means 72, correlation coefficient means 74, and correlation correction means 76.

The reference signal means 68 produces an initial reference signal $R_i$ whose value changes significantly with temperature. As illustrated in FIG. 3, the reference signal $R_i$ is preferably created by summing the digitized outputs from the first and third strain gauges 30 and 34 respectively. Because the first strain gauge 30 and third strain gauge 34 are spaced apart by 180 degrees about the longitudinal axis of the support 14, flex in the support produces an increase in the first strain gauge signal and a decrease of equal magnitude in the third strain gauge signal. Therefore, flex in the support 14 causes little or no variation in the signal $R_i$. However, temperature variations in the strain gauges 30 and 34 cause the strain gauge outputs to simultaneously increase or decrease. Therefore, the value of signal $R_I$ changes significantly with temperature variations but changes little with changes in flex in the support 14. Any high frequency components are created by flex in the support 14 and are removed by low pass filter 78 to produce the signal $R_I$.

Still referring to FIG. 3, the reference signal offset register means 70 stores a reference offset signal $R_{offset}$ in response to the latch signal from the comparator 62. The reference correcting means 72 then subtracts the reference offset signal $R_{offset}$ from the reference signal $R_I$ to produce an offset corrected reference signal $R_{OC}$. This corrected reference signal $R_{OC}$ is proportional to the magnitude of the temperature drift that has occurred since the most recent period of minimal wind activity, that is, since the last offset signals were latched into offset registers 64, 66, and 70.

The correlation coefficient means 74 receives each of the various offset signals $X_{offset}$ $Y_{offset}$ and $R_{offset}$ recorded during periods of minimal wind activity and produces an X correlation coefficient signal $C_X$ and a Y correlation coefficient signal $C_y$. The correlation coefficient signals represent the expected change in the $X_I$ and $Y_I$ signals respectively with a change in the $R_I$ signal, such changes representing errors caused by temperature drift in the strain gauge readings. Preferably, the correlation coefficient signals $C_x$ and $C_y$ are derived as follows:

$$C_X = (X_j - X_k)/(R_j - R_k)$$

$$C_Y = (Y_j - Y_k)/(R_j - R_k)$$

where samples j and k are selected such that the absolute value of $(R_j - R_k)$ exceeds a predetermined value. This approach linearly relates the $X_I$ and $Y_I$ signals to the $R_I$ signal.

The correlation correction means 76 multiplies correlation coefficient $C_X$ by the corrected reference signal $R_{OC}$ and subtracts the product from the signal $X_{OC}$ to produce the output signal $X_C$. The correlation correction means 76 also multiplies the correlation coefficient $C_Y$ by the corrected reference signal $R_{OC}$ and subtracts the product from the signal $Y_{OC}$ to produce the output signal $Y_C$. The output signals $X_C$ and $Y_C$ therefore relate to the flex in the support 14 in the X and Y directions respectively, and are corrected for offset and temperature drift and high frequency oscillations. It is the corrected output signals $X_C$ and $Y_C$ that the wind velocity and direction calculating means 37 preferably uses to produce wind velocity and direction values.

Referring again to FIG. 2, the rain collection surface 18 resides below a rain collection opening 80 located at the top of the wind force receiving body 12. Preferably, a coarse screen 82 covers the rain collection opening 80 to keep out larger debris. The rain collection surface 18 narrows to a funnel bottom 83 with a fine screen 84 through which collected water is directed to the rain measuring means 20. A heater element (not shown) may be installed around the funnel bottom to prevent ice from forming at that location. Additional heater elements or devices (not shown) may be associated with the weather monitoring device 10 to prevent ice from accumulating on the exterior of the body 12 and thereby interfering with wind measurements. Heater elements may also be employed in the device 10 to melt snow accumulations and allow precipitation monitoring in sub-freezing environments.

The rain measuring means 20 measures the volume of rain collected on the rain collection surface 18 and preferably includes a rain collection reservoir 86 with a drop producing opening 88, drop detection means 90, and volume monitoring means 92 at a remote location. The rain collection reservoir 86 receives all of the water funnelled from the rain collection surface 18 and emits individual drops of a known volume through opening 88. The drop detection means 90 detects the individual drops and these drops are then counted by the volume monitoring means 92 to provide a rain volume indication per unit area.

The rain collection reservoir 86 is isolated from the wind collection body and preferably mounted directly on the base 22. Reservoir 86 also includes a fine filter 94 that filters the water passing through the rain collection reservoir to remove particles. The drop producing opening 88 comprises a tension drop creator capable of producing individual drops all having substantially uniform volume.

The drop detection means 90 preferably comprises a piezoelectric element positioned below the drop producing opening 88 so that each drop emitted by the drop producing opening directly impacts the element. The impact of each drop causes the element to produce a drop signal which is then counted by volume monitoring means 92. The volume monitoring means 92 also calculates the total volume of water that has fallen upon the rain collection surface 18 by multiplying the number of drop signals by the volume of each drop. Finally, the volume monitoring means 92 divides the total volume by the area of the opening 80 to produce value representing precipitation volume per unit area.

The volume monitoring means 92 is preferably implemented in a suitable processor and programming capable of performing the required operations such as drop counting and having storage means for storing drop volume values. Although shown separately in FIG. 2 for simplicity of illustration the volume monitoring means 92 may be implemented in the same processor used for the signal processing means 36. Also, since drop volume through opening 88 varies with temperature, the volume monitoring means 92 is preferably capable of using the drop volume value dictated by the particular operating temperature. The programming in this case preferably includes a look-up table for choosing the correct drop volume for a given temperature input.

The method for monitoring weather parameters according to the invention comprises detecting the resultant force applied to the support 14 by wind acting on the wind force receiving body 12 mounted on the support, and determining wind velocity and direction from the resultant force. The method may also include collecting rain within the force receiving body 12 and measuring the volume of the rain collected in the force receiving body simultaneously with the steps of detecting the resultant force and determining the wind velocity and direction from such resultant force.

The step of detecting the resultant force applied to the support 14 preferably comprises measuring the longitudinal strain in the support at a plurality of positions about the circumference of the support with suitable strain gauges such as gauges 30, 32, and 34 shown best in FIG. 3. The strain in support 14 is related to wind speed against body 12 and the step of determining wind velocity and direction from the resultant force includes using trigonometric relationships between the strain measurements to produce a wind velocity value. With the directions of the strain values known, wind direction is determined by calculating the angle produced between the strain components.

The above described preferred embodiments are intended to illustrate the principles of the invention, but not to limit the scope of the invention. Various other embodiments and modifications to these preferred embodiments may be made by those skilled in the art without departing from the scope of the following claims.

We claim:

1. A weather monitoring device comprising:
   (a) a wind force receiving body;
   (b) a support connected to and supporting the wind force receiving body;
   (c) force detecting means associated with the support for detecting a resultant force applied to the support by wind acting on the wind force receiving body and for determining wind velocity and direction from the resultant force, the force detecting means including a plurality of strain gauges in position to measure longitudinal strain in the support at least at two different radial positions;
   (d) a rain collection surface mounted within the wind force receiving body and below a rain collection opening in a top of the wind force receiving body; and
   (e) rain measuring means associated with the rain collection surface for measuring the volume of rain collected on the rain collection surface.

2. The weather monitoring device of claim 1 wherein the plurality of strain gauges are positioned on the support at substantially the center of gravity of a combined structure comprising the support, the wind force receiving body, and the rain collecting surface.

3. The weather monitoring device of claim 1 wherein the force detecting means comprises:
   (a) a first strain gauge in position to measure longitudinal strain at a first position on the circumference of the support;
   (b) a second strain gauge in position to measure longitudinal strain at a second position on the circumference of the support, the second position being at substantially a same longitudinal position on the support as the first position and being spaced 90 degrees from the first position about a longitudinal axis of the support:
   (c) a third strain gauge in position to measure longitudinal strain at a third position on the circumference of the support, the third position being at substantially the same longitudinal position on the support as the first position and being spaced 180 degrees from the first position about the longitudinal axis of the support; and
   (d) signal processing means for receiving strain signals from the first, second, and third strain gauges and for producing a wind velocity indication and a wind direction indication therefrom.

4. The weather monitoring device of claim 3 wherein the signal processing means comprises:
   (a) signal differencing means for receiving a first signal output from the first strain gauge, a second signal output form the second strain gauge, and a third signal output from the third strain gauge, for subtracting the second signal output from the first signal output to produce an initial X signal indicative of the deflection of the support in an X direction, and for subtracting the second signal from the third signal to produce an initial Y signal indicative of the deflection of the support in a Y direction;
   (b) threshold turbulence signal means for extracting initial X and initial Y signals and producing a threshold turbulence signal in response to a minimal wind velocity condition;
   (c) offset register means for storing an offset X signal and an offset Y signal in response to the threshold turbulence signal; and
   (d) offset signal differencing means for subtracting the offset X signal from the initial X signal to produce a corrected X signal and for subtracting the offset Y signal from the initial Y signal to produce a corrected Y signal.

5. The weather monitor of claim 4 wherein the signal processing means further includes:
   (a) reference signal means for producing a reference signal whose value changes significantly with temperature;
   (b) reference signal offset register means for storing a reference offset signal in response to the turbulence threshold signal;
   (c) correlation coefficient means for receiving the offset X and Y signals, the reference offset signal, and a turbulence signal from the threshold signal means, and producing an X correlation coefficient signal and a Y correlation coefficient signal;
   (d) reference correcting means for subtracting the reference offset signal from the reference signal to produce a corrected reference signal; and
   (e) correlation correction means for producing an X correlation product of the X correlation coefficient and the corrected reference signal and a Y correlation product of the Y correlation coefficient and the corrected reference signal, and for adding the X correlation product to the corrected X signal and the Y correlation product to the corrected Y signal.

6. The weather monitoring device of claim 1 wherein the rain measuring means comprises:
   (a) a rain collection reservoir supported separately from the rain collection surface and wind force receiving body and in position to receive from the rain collection surface, all of the rain collected on the rain collection surface;
   (b) a drop producing opening formed in a bottom of the rain collection reservoir capable of draining all of the rain from the rain collection reservoir by emitting therefrom individual drops all having substantially uniform volume;
   (c) drop detection means for detecting each drop emitted from the drop producing opening in the rain collection reservoir; and
   (d) volume monitoring means for counting the number of drops emitted from the drop producing opening and producing a volume indication.

7. The weather monitoring device of claim 6 wherein the drop detection means comprises a piezoelectric element mounted below the drop producing opening so that drops emitted by the drop producing opening impact directly thereon to produce a drop signal.

8. A weather monitoring device comprising:
   (a) a wind force receiving body;
   (b) a support connected to and supporting the wind force receiving body, the support including a cylindrical rod section; and (c) force detecting means associated with the support for detecting a resultant force applied to the support by wind acting on the wind force receiving body and for determining wind velocity and direction from the resultant force, the force detecting means including a plurality of strain gauges in position to measure longitudinal strain in the cylindrical rod section at least at two different positions about the circumference thereof.

9. The weather monitoring device of claim 8 wherein the plurality of strain gauges are positioned on the support at substantially the center of gravity of a combined structure comprising the support and the wind force receiving body.

10. The weather monitoring device of claim 8 wherein the force detecting means comprises:
(a) a first strain gauge in position to measure longitudinal strain at a first position on the circumference of the support;
(b) a second strain gauge in position to measure longitudinal strain at a second position on the circumference of the support, the second position being at substantially a same longitudinal position on the support as the first position and being spaced 90 degrees from the first position about a longitudinal axis of the support;
(c) a third strain gauge in position to measure longitudinal strain at a third position on the circumference of the support, the third position being at substantially the same longitudinal position on the support as the first position and being spaced 180 degrees from the first position about the longitudinal 14 axis of the support; and
(d) signal processing means for receiving strain signals from the first, second, and third strain gauges and for producing a wind velocity indication and a wind direction indication therefrom.

11. The weather monitoring device of claim 10 wherein the signal processing means comprises:
(a) signal differencing means for receiving a first signal output from the first strain gauge, a second signal output form the second strain gauge, and a third signal output from the third strain gauge, for subtracting the second signal output from the first signal output to produce an initial X signal indicative of the deflection of the support in an X direction, and for subtracting the second signal from the third signal to produce an initial Y signal indicative of the deflection of the support in a Y direction;
(b) threshold turbulence signal means for extracting initial X and initial Y signals corresponding to a low wind velocity condition and producing a threshold turbulence signal in response to the wind velocity;
(c) intermediate signal extraction means for extracting an intermediate X signal corresponding to the defection of the support in the X direction and extracting an intermediate Y signal corresponding to the deflection of the support in the Y direction:
(d) offset register means for storing an offset intermediate X signal and an offset intermediate Y signal in response to the threshold turbulence signal; and
(e) offset signal differencing means for subtracting the offset intermediate X signal from the intermediate X signal to produce a corrected X signal and for subtracting the offset intermediate Y signal from the intermediate Y signal to produce a corrected Y signal.

12. The weather monitor of claim 11 wherein the signal processing means further includes:
(a) reference signal means for producing a reference signal whose value changes significantly with temperature;
(b) reference signal offset register means for storing a reference offset signal in response to the turbulence threshold signal;
(c) correlation coefficient means for receiving the offset intermediate X and Y signals, the reference offset signal, and a turbulence signal from the threshold signal means, and producing an X correlation coefficient signal and a Y correlation coefficient signal;
(d) reference correcting means for subtracting the reference offset signal from the reference signal to produce a corrected reference signal; and
(e) correlation correction means for producing an X correlation product of the X correlation coefficient and the corrected reference signal and a Y correlation product of the Y correlation coefficient and the corrected reference signal, and for adding the X correlation product to the corrected X signal and the Y correlation product to the corrected Y signal.

13. A method of monitoring weather parameters comprising the steps of:
(a) detecting a resultant force applied to a cylindrical rod section of a support by measuring longitudinal strain at the surface of the cylindrical rod section at a plurality of positions about the circumference thereof, the resultant force being applied by wind acting on a wind force receiving body which is rigidly mounted in a fixed position on the support; and
(b) determining wind velocity and direction from the resultant force applied to the support.

14. The method of claim 13 wherein the step of detecting the resultant force further comprises:
(a) detecting longitudinal strain at a first strain gauge mounted at a first position on the circumference of the cylindrical rod section;
(b) detecting longitudinal strain at a second strain gauge mounted at a second position on the circumference of the cylindrical rod section, the second position being at substantially a same longitudinal position of the cylindrical rod section as the first position but spaced at substantially 90 degrees from the first position about a longitudinal axis of the cylindrical rod section; and
(c) detecting longitudinal strain at a third strain gauge mounted at a third position on the circumference of the cylindrical rod section, the third position being at substantially the same longitudinal position of the cylindrical rod section as the first position but spaced at substantially 180 degrees from the first position about a longitudinal axis of the cylindrical rod section.

15. The method of claim 14 wherein the step of determining wind velocity and direction includes the steps of:
(a) subtracting a second signal output produced by the second strain gauge from a first signal output produced by the second strain gauge to produce an initial X signal indicative of the deflection of the support in an X direction, and for subtracting the second signal from a third signal produced by the third strain gauge to produce an initial Y signal indicative of the deflection of the support in a Y direction;

(b) producing a threshold turbulence signal from the initial X and initial Y signals in response to a predetermined minimal wind velocity condition;

(c) storing an offset X signal and an offset Y signal in response to the threshold turbulence signal; and (d) subtracting the offset X signal from the initial X signal to produce a corrected X signal and for subtracting the offset Y signal from the initial Y signal to produce a corrected Y signal.

16. The method of claim 15 wherein the step of determining wind velocity and direction includes the steps of:

(a) producing a reference signal whose value changes significantly with temperature;

(b) storing a reference offset signal in response to the turbulence threshold signal;

(c) producing an X correlation coefficient signal and a Y correlation coefficient signal from the offset X and Y signals, the reference offset signal, and a turbulence signal from which the threshold signal is derived;

(d) subtracting the reference offset signal from the reference signal to produce a corrected reference signal;

(e) producing an X correlation product of the X correlation coefficient and the corrected reference signal and a Y correlation product of the Y correlation coefficient and the corrected reference signal; and (f) adding the X correlation product to the corrected X signal and the Y correlation product to the corrected Y signal.

17. The method of claim 13, further comprising the step of:

(a) collecting rain within the force receiving body; and (b) measuring the volume of the rain collected in the force receiving body simultaneously with the steps of detecting the resultant force and determining the wind velocity and direction therefrom.

18. The method of claim 17 wherein measuring the volume of the rain collected in the force receiving body comprises the steps of:

(a) directing all of the rain collected on the rain collection surface into a rain collection reservoir that is supported separately from the rain collection surface and the wind force receiving body;

(b) draining all of the rain from the rain collection reservoir by emitting individual drops of substantially uniform volume from a drop producing opening formed in a bottom of the rain collection reservoir;

(c) detecting each drop emitted from the drop producing opening in the rain collection reservoir; and (d) counting the number of drops emitted from the drop producing opening and producing a volume indication.

* * * * *